UNITED STATES PATENT OFFICE.

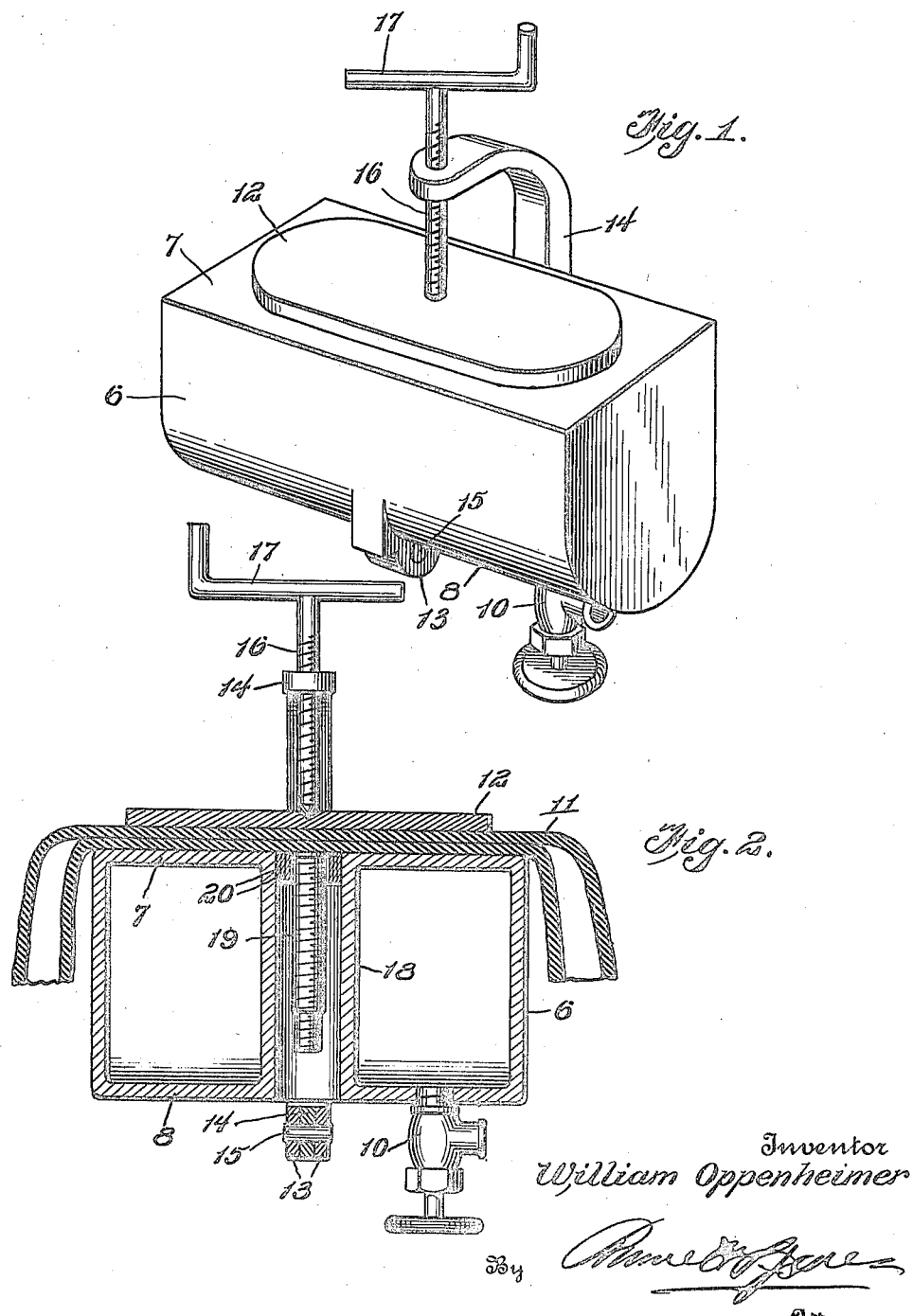

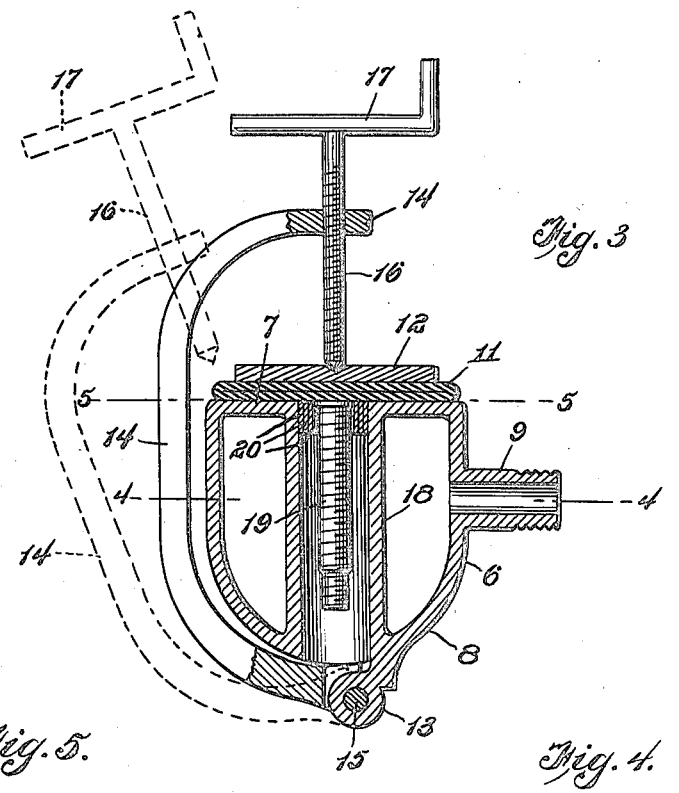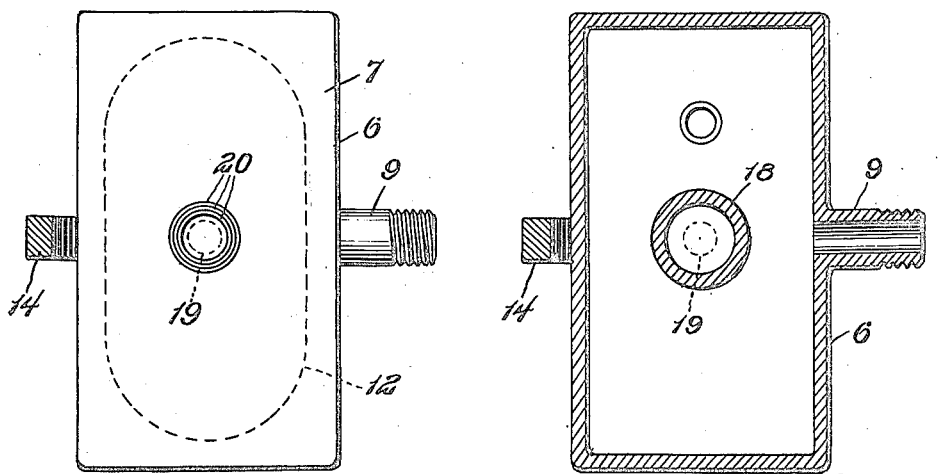

WILLIAM OPPENHEIMER, OF BRAWLEY, CALIFORNIA.

VULCANIZING DEVICE.

1,323,544.     Specification of Letters Patent.     Patented Dec. 2, 1919.

Application filed May 14, 1919. Serial No. 297,070.

*To all whom it may concern:*

Be it known that I, WILLIAM OPPENHEIMER, a citizen of the United States, residing at Brawley, in the county of Imperial and State of California, have invented new and useful Improvements in Vulcanizing Devices, of which the following is a specification.

This invention relates to devices for performing vulcanizing operations, the primary object of which is to provide means of a simple and improved nature for enabling the tire or other object to be vulcanized to be readily applied to and removed from the vulcanizing device without the necessity of entirely disorganizing the vulcanizing device and without danger or injury to the object of the vulcanizing operation.

A further object of the invention is to provide a vulcanizer of comparatively small size and light weight so as to be easily manipulated, and which is adapted to be heated through the agency of steam admitted to the vulcanizing device in an improved manner.

A still further object of the invention is to provide improved means for clamping the tire or object to be vulcanized upon the body, and which means is of simple construction and which may be easily and quickly moved into or out of operation without affecting any of the other parts of the apparatus or the object being vulcanized, and which, when swung to inoperative position, is completely out of the way so as not to hinder further treatment of the tube or interfere with the removal of the latter from the vulcanizer.

A still further and particular object of the invention is to provide a vulcanizer adapted particularly to be used in the treatment or repair of inner tubes for vehicle tires, and wherein means of an improved nature is utilized for accommodating the valve stems of such tubes, and also comprehending means for properly accommodating valve stems of different sizes and constructions.

With these and other objects in view, the invention consists of the features of construction, combination and arrangement of parts hereinafter fully described and claimed, reference being had to the accompanying drawings, in which:—

Figure 1 is a perspective view of a vulcanizer constructed in accordance with the invention, Fig. 2 is a longitudinal section taken through the improved vulcanizer and illustrating the parts in the position they will assume when a tube is undergoing the vulcanizing operation, Fig. 3 is a vertical central sectional view taken through the vulcanizing device at right angles to Fig. 2, Fig. 4 is a horizontal sectional view taken on line 4—4 of Fig. 3, and Fig. 5 is a similar view taken upon line 5—5 of Fig. 3.

Referring now more particularly to the drawings, 6 indicates a body or base, formed preferably of cast metal and being of comparatively small size and light weight so as to be easily handled. This body is hollow as shown, and has a straight flat unobstructed top surface 7 and preferably a rounded bottom portion 8. The side and end walls connecting the top and bottom portions may be straight as shown. The interior of this body is adapted to receive steam as a heating agency, and the steam is admitted to the body through the nipple 9, it being understood that the steam is conveyed to the nipple through a suitable tubing or pipe (not shown). To enable the water which may accumulate within the body to be drawn off, and to facilitate the free flow of steam, a drain or exhaust cock or valve 10 is arranged in the bottom of the body. This valve may be located near one end of the body and communicates with the interior thereof at a low point so as to facilitate free drainage.

The article to be vulcanized, such as the inner tube indicated at 11, rests upon the flat top surface 7 and is treated by the heat of the steam conducted through the top wall, and the object 11 is held properly seated upon the top surface by a clamp block or plate 12. This plate may have a flat, smooth and unobstructed lower surface, and it may be of substantially the same length and breadth as the vulcanizer body or a trifle smaller. To properly hold this clamp plate in proper position upon the tube 11 and to exert the desired or required pressure upon the tube, improved clamping means for the plate is provided.

The base or body 6 has arranged upon its bottom portion and preferably intermediate its ends, a pair of spaced lugs 13, the same being parallel with the end walls of the body. These lugs confine between them one end of a clamping arm 14, and a pin 15 extending through the spaced lugs and clamping arm end holds the said arm firmly to the body but permits of free swinging movement of the arm. The arm in the present instance is of substantially U-shape, and is of such length that when swung to the limit of its inward or operative movement, the free end of the said arm is spaced above the upper surface of the clamp plate 12. By reason of the arm 14 being pivoted intermediate the ends of the base, the free end of the said arm when swung inwardly will overlie the central portion of the clamp plate 12. This free end of the arm is equipped with means for causing downward pressure to be exerted upon the plate 12, and in the present instance this pressure exerting means consists in the screw shank 16 threaded through the free end of the said arm. The lower end of this shank is pointed as shown, and engages in a shallow recess in the central portion of plate 12. The upper end of the shank is provided with a hand grip 17, to facilitate free turning of the shank.

As the vulcanizing device is adapted particularly for use in operating upon or treating the inner tubes of vehicle tires, means is provided whereby those portions of the tube adjacent to the valve stem thereof may be operated upon without distorting the tube or injuring or otherwise affecting the fabric thereof or the valve stem. The body 6 is provided with a central tubular portion 18 connecting the bottom and top thereof, and this tubular portion is open at both ends. When a portion of the tube adjacent to the valve stem is to be treated, the tube is applied to the top surface 7 as shown in Figs. 3 and 4, with the valve stem 19 extending downwardly into the tubular portion 18. The stem is thus accommodated in the base and is so positioned as not to be injured during the vulcanizing operation or in the way of the operator of the device. The tubular portion 18 is preferably of slightly greater diameter than the largest of the valve stems used in connection with such inner tubes, and to insure a snug fit of the stem within the tubular portion and to properly centralize the stem therein, rings such as those indicated at 20 are employed. These rings vary in size and are to be inserted in the upper end of the tubular portion prior to the application of the valve stem thereto. These rings frictionally engage with the walls of the tubular portion and with each other when nested and maintain the valve stem snugly fitted in the tubular portion, as will be readily understood.

In operation, assuming it to be desired to treat or vulcanize a part of the tube adjacent to the valve stem 19 the latter is inserted in the tubular portion 18, after the rings 20 have been properly applied thereto. The tube rests and is smoothly folded in the manner shown upon the smooth unobstructed upper surface 7 of the body. The arm 14 is then swung inwardly so that the shank 16 is disposed directly over the central depression in the clamp plate 12. Rotation of this shank 16 in the proper direction will cause the said shank to move downwardly so as to engage its pointed lower end with the plate 12, and the degree of pressure exerted will be governed by the nature of the vulcanizing operation to be performed. The tube is thus firmly clamped in proper position upon the body, and this clamping action prevents the arm 14 swinging outwardly or to inoperative position. Steam is then introduced to the body through the nipple 9, and the heat conducted through the walls 7 will operate upon the tube, as will be understood. Should the compartment in the body become air bound, or should condensation occur therein, the valve 10 may be temporarily opened. The steam is free to circulate thoughout the length, breadth and depth of the base, and around the central upstanding tubular portion 18. The stem 19 confined by this tubular portion does not contact with the latter and therefore is prevented from becoming heated to an injurious degree, and is protected from damage during the vulcanizing operation. When it is desired to remove the tube after the operation has been completed the clamping shank 16 is withdrawn, and the arm 14 is swung outwardly, after which the clamp plate 12 may be removed. By mounting the clamp arm in the manner shown and described, the same may be swung so that its free end and the clamping means carried thereby will be removed entirely from the upper portion of the body, and can not therefore interfere with the operator in applying tubes to the device or removing them therefrom.

Having thus fully described my invention, I claim:—

1. In a device of the class described, a hollow body having an operative surface, a tube extending from said operative surface into said body, means for clamping an article to be vulcanized against said operative surface, and means in said tube, comprising a plurality of concentrically arranged removable members, for centering an object in said tube.

2. In a device of the class described, a body having a flat upper surface and a round bottom, the said body including a heating chamber, an upstanding tubular portion within said body and spaced from the walls thereof and connecting the top and bottom of the body, an arm of substantially U-shape having one of its ends pivoted to the bottom portion of the body intermediate the ends of the latter, the opposite end of said arm adapted to overlie the central portion of said flat surface, and means adjustably mounted upon the free end of the arm for clamping an article to be vulcanized against said flat surface.

3. In a device of the class described, a body having a heating chamber therein, an operative surface upon said body, a tubular portion connecting said operative surface with the opposite face of the body, a clamp arm pivoted upon said body and having its free end adapted to overlie one end of the tubular portion, a clamp screw threaded in said free end of the arm and axially alined with the tubular portion when the arm is swung inwardly, and a clamp plate interposed between the screw and the said operative surface.

4. In a device of the class described, a body having a flat upper surface and a rounded bottom, the said body including a heating chamber, a nipple on said body communicating with said chamber, an upstanding tubular portion within said body and spaced from the walls thereof and connecting the top and bottom of the body, an arm of substantially U-shape having one of its ends pivoted to the bottom portion of the body intermediate the ends of the latter, the opposite end of said arm adapted to overlie the central portion of said flat surface, a shank threaded in said free end of the arm and adapted to move toward or away from said flat surface, and a plate interposed between the shank and the said flat surface.

5. In a device of the class described, a vulcanizer comprising a body including a heating chamber and an operative surface, a tubular portion in communication with said operative surface, the said tubular portion adapted to seat a valve stem and to loosely accommodate the same, and rings adapted to be inserted in the tubular portion to maintain a valve stem centrally arranged therein and to prevent the said stem moving laterally.

In testimony whereof I affix my signature.

WILLIAM OPPENHEIMER.